Patented Sept. 9, 1941

2,255,109

UNITED STATES PATENT OFFICE 2,255,109

LUMINESCENT GLASS AND ELECTRIC DISCHARGE LAMP MADE THEREFROM

Hellmuth Fischer, Ilmenau, Germany

No Drawing. Application September 26, 1939, Serial No. 296,616. In Germany October 5, 1938

17 Claims. (Cl. 250—81)

My invention relates to improvements in luminescent glass, and electric discharge lamps made therefrom. More particularly my invention relates to glass containing a metal of the group consisting of uranium and lead as a substance exciting luminescence and which is used as the wall of electric discharge lamps, particularly low pressure mercury vapor luminescent lamps containing one or more noble gases. Such glass I shall herein characterize as luminscent glass of the uranium-lead type. The object of the improvements is to provide a glass which when used as the wall of an electric discharge lamp has increased luminescence.

As is known in the art the light intensity of a noble gas-mercury vapor luminous tube the wall of which contains uranium is by 14% higher than the light intensity of a tube made from a glass of similar composition which does not contain uranium, and the said light intensity may be further increased to 105% when the iron content of the glass wall, which contains 2.2% $U_3O_8$, is reduced from 0.095% to 0.012%.

I have discovered that the luminescence of a glass containing a metal of the group consisting of uranium and lead and used as the wall of an electric discharge device, particularly of a noble gas-mercury vapor luminous tube, can be further increased by adding to a batch which results in 100 kg. glass at least 3.5 kg. of zinc oxide and adding the substances containing alkali at such a rate that in the finished glass the ratio of $K_2O$ to $Na_2O$ is at least 2:1. I have further discovered that the luminescence of the said glasses may be further increased by giving the same a fluorine content so high as is possible without causing opalescence of the glass. However a fluorine content which causes slight opalescence, and which does not yet result in a loss of the light passing through the glass still has a favourable effect, which however is not better than a smaller fluorine content which does not cause opalescence. The said fluorine may be added to the batch in any suitable composition, for example in the form of cryolite, calcium fluoride, alkaline fluoride or alkaline-silicofluoride.

The luminescence of the glass may be further increased by adding substances to the batch such that the finished glass contains at least 2% boric acid anhydride, though this increase of luminescence is not high. Finally, the luminescence may be increased by adding to the batch resulting in 100 kg. glass about 1 to 2 kg. potassium or sodium nitrate, or other nitrates, such as barium nitrate.

The luminescence of glass containing uranium and which is free of lead may be further improved by adding to the batch resulting in 100 kg. glass at least 0.3 kg. of arsenic trioxide or arsenic pentoxide.

The said additions are particularly effective if the batch is made from components which as far as possible are poor in iron, and if care is taken that in the course of the melting process no iron impurities have access to the glass.

The following is to show how by gradually altering in the sense of my invention the composition of a luminescent uranium glass hitherto known, the light intensity of a luminous tube the wall of which consists of the glass is gradually improved.

In the following the term "luminous tube" will be used for describing mercury vapor noble gas luminous tubes, and particularly electric low pressure- mercury vapor-luminous tubes, the filling of which contains one or more noble gases. If, in the wall of such a luminous tube composed of sections of glasses of different compositions, one section is made from an uranium glass of about the following known composition (which hereinafter will be referred to as 1),

| | Per cent |
|---|---|
| $SiO_2$ | 70.85 |
| $Al_2O_3$ | 2.4 |
| $Na_2O$ | 11.45 |
| $K_2O$ | 5.45 |
| $B_2O_3$ | 4.0 |
| $CaO$ | 5.05 |
| $U_3O_8$ | 0.80 |
| $Fe_2O_3$, ca | 0.02 | the batch of which was molten with an addition of saltpeter, and if the outer surface of the said section has been made dull by means of a sand blast, the luminous tube has a light intensity which is 2.2 times that of another section of the same diameter made from colourless non-luminescent and dimmed clear glass sealed with the same luminous tube. This value was found by comparative tests of the light intensity by means of a selenium photocell which has a spectral curve of sensitiveness approximating that of the human eye, and a milliamperemeter.

Also the values of the intensity of luminous tubes given hereafter apply to tubes which were externally dimmed by means of a sand blast.

If in the glass (1) described the major part of the calcium oxide and a part of the silicic acid is replaced with zinc oxide, so that the glass contains about 7% ZnO, the light intensity of a luminous tube made therefrom is increased, other conditions being the same, to three times the intensity of a tube section made from colourless clear and dimmed glass. The zinc oxide content may be further increased, but it does not result in a substantial increase of the light intensity of the tube. However, a reduction of the zinc oxide content results in a reduction of the light intensity. A zinc oxide content of less than about 3.5% ZnO does not cause a substantial increase of the light intensity of the luminous tube made therefrom.

*Example 1.*—A glass thus composed and having a comparatively high content of ZnO may have the following composition (2):

| | Per cent |
|---|---|
| $SiO_2$ | 67.9 |
| $Al_2O_3$ | 2.4 |
| $Na_2O$ | 11.45 |
| $K_2O$ | 5.45 |
| $B_2O_3$ | 0.4 |
| CaO | 1 |
| ZnO | 7 |
| $U_3O_8$ | 0.8 |
| $Fe_2O_3$ | 0.02 |

If to the batch of the glass (2) containing zinc oxide about 1.3 kg. arsenic trioxide or pentoxide is added (3), the light intensity is increased to 3.3 times the intensity of a tube section made from ordinary, non-luminescent dimmed clear glass. A further increase of the arsenic oxide, say to the double amount neither improves nor reduces the light intensity. If the amount of arsenic oxide is reduced the light intensity at first slightly falls off. An addition of less than 0.3% has only a slight effect.

*Example 2.*—A batch containing zinc oxide and an arsenic compound may be composed as follows (3):

| | Kilograms |
|---|---|
| Sand, about 99.9% $SiO_2$ | 67.70 |
| Alumina hydrate, about 64.4% $Al_2O_3$ | 3.70 |
| Uranium oxide, light yellow, Ia (sodium uranate) | 1.00 |
| Soda, about 98% $Na_2CO_3$ | 19.55 |
| Potassium nitrate | 1.80 |
| Potash, about 97% $K_2CO_3$ | 6.95 |
| Boric acid | 7.00 |
| Zinc oxide | 7.00 |
| Calcium carbonate, about 99% $CaCO_3$ | 1.80 |
| Arsenic trioxide, ground | 1.30 |

The glass made from the said batch is composed as follows:

| | Per cent |
|---|---|
| $SiO_2$ | 67.7 |
| $Al_2O_3$ | 2.39 |
| $Na_2O$ | 11.4 |
| $K_2O$ | 5.43 |
| $B_2O_3$ | 3.94 |
| ZnO | 6.97 |
| CaO | 1 |
| $U_3O_8$ | 0.80 |
| $As_2O_5$ | 0.35 |
| $Fe_2O_3$ | 0.02 |

The content in arsenic oxide may be changed in other cases according to the volatilization which varies according to the temperature and the time of melting. In the batch of the glass described in Example 2 (3) the ratio of $K_2O$ to $Na_2O$ is about 0.48 to 1. If the said ratio is altered so that the finished glass contains about 14 parts by weight of $K_2O$ to 1 part by weight of $Na_2O$ (4), the light intensity of a luminous tube made from the glass (4) is increased to about 3.7 times the light intensity of a tube section of the said sand blast clear glass.

If the ratio of the alkalies within the glass is further altered in the sense of increasing the amount of $K_2O$, say so far that the sodium is completely replaced with potassium, a further slight increase of the light intensity of the luminous tube is obtained.

If the ratio of $K_2O$ to $Na_2O$ is reduced, the light intensity of the luminous tube slowly falls off. If the ratio of the weights of the said substances is further reduced to less than 2 : 1, a considerable increase of the light intensity of the luminous tube as compared to the glass (3) is not observed.

If from the batch of glass (4) the boric acid is omitted the light intensity of a luminous tube made from the glass is reduced by about 15% as compared to the light intensity of a tube section of ordinary clear glass. A reduction of the amount of $B_2O_3$ in the glass to about 2% results in an immaterial reduction of the light intensity of the luminous tube, and an increase of the $B_2O_3$ content beyond 4% does not result in a substantial increase of the luminescence.

I have found that the light intensity of a luminous tube is further improved if to the glass batch of the uranium glass substances containing fluorine, such as cryolite, calcium fluoride, alkaline fluoride or alkaline silicofluoride are added in an amount such that the glass is still clear, and that a slight increase of the said substances would cause a slight opalescence of the glass or the tubes or hollow bodies made therefrom. Therefore the content in fluorine in the glass should be slightly below the saturation point thereof. The permissible fluorine content is slightly different according to the total alkali content in the glass, and according to the content of the glass in alumina and bivalent glass forming substances, particularly zinc oxide.

If the batch of the glass described under (4) is thus molten with substances containing flourine (5), the light intensity of a luminous tube made from the said glass (5) is increased to about 4.7 times the intensity of a tube section of non-luminescent dimmed clear glass.

The light intensity of a tube made from the glass (5) can be increased to about 5.3 times the intensity of a tube section made from dimmed, non-luminescent clear glass by externally providing the glass tube with a layer of opal or opalescent glass which absorbs as little light as possible. Thereby the total reflection of the luminescent light produced in the inner layer of glass is obviated in a more effective way than by dimming the outer surface of the luminescent glass, so that the light of luminescence passes outwardly without loss. For varying the shade of the bluish-green light emitted from the luminous tube made from such glass the layer of opal or opalescent glass (covering in case of need the layer of luminescent uranium glass) may be coloured. For the same purpose, or for strengthening the wall of the tube, or for protecting the coating of opal or opalescent glass against atmospheric influences, or for saving luminescent glass, luminous tubes made from my improved glass may also be provided with a layer of colourless or coloured clear glass, which affords an outer layer on the layer of opal or opalescent glass, or an intermediate layer between the layer of uranium glass and the layer of opal glass.

*Example 3.*—A batch composed according to the aforesaid rules so that a maximum of the increase of the luminescence of the glass is obtained if it is used as the wall of a luminous tube is composed as follows (5):

| | Kilograms |
|---|---|
| Sand, ca. 99.9% $SiO_2$ | 63.8 |
| Alumina hydrate, about 66% $Al_2O_3$ | 2.8 |
| Cryolite | 1.7 |
| Boric acid | 5.2 |
| Potash, about 99% | 25. |
| Sodium fluoride | 0.37 |
| Calcium fluoride | 2.1 |
| Calcium carbonate | 0.7 |
| Zinc oxide | 6. |
| Uranium oxide, light yellow, Ia (sodium uranate) | 1.35 |
| Potassium nitrate | 1.80 |
| Arsenic oxide, ground | 1.20 |

The glass has substantially the following composition:

| | Per cent |
|---|---|
| $SiO_2$ | 64.30 |
| $Al_2O_3$ | 2.25 |
| $B_2O_3$ | 2.88 |
| $As_2O_5$ | 0.60 |
| $Fe_2O_3$ | 0.015 |
| $U_3O_8$ | 1.12 |
| CaO | 1.86 |
| ZnO | 5.95 |
| $K_2O$ | 17.80 |
| $Na_2O$ | 1.26 |
| F | 1.95 |

The ratio of $Na_2O$ to $K_2O$ is about 1:14.1. According to the Standard test (powder method) of the Deutsche Glastechnische Gesellschaft the glass has a loss of weight of 16 milligrammes and therefore it is near the limit of the second to the third hydrolytic class of Mylius. Within a temperature interval of from 20 to 400° C., its linear coefficient of expansion is about $95.10^{-7}$.

Also when luminous tubes made from the glass (5) are inspected by the eye and without measuring instruments they are distinguished by a luminosity which is substantially brighter than that of a luminous tube made from the glass described under (1), under equal current conditions.

The glass referred to under (5) is, of course, understood to be merely an example. Within the scope of the invention, the ratio of $K_2O$ to $Na_2O$ can be varied, and also the total alkali content can be increased or reduced. Also the other components such as silicic acid, boric acid, arsenious acid, zinc oxide, fluorine etc. can be combined in larger or smaller percentages, unless definite smallest percentages or additions have been specifically prescribed. The addition of the fluorine or the potassium oxide to the batch may be made also in another way. For example, instead of being added as a part of three different substances fluorine may be added by a single substance, for example in the form of fluorspar or sodium-silicofluoride or potassium-silicofluoride. Uranium may be added to the batch in another form, for example in the form of anhydric uranic acid ($UO_3$) or uranium dioxide ($UO_2$). Also the ratio of potash to potassium nitrate may be different from that given in the example. Further, the content of the glass in iron oxide may be higher or lower, which variation however has the result respectively of reducing or increasing the intensity of luminescence.

If the glass is used as the wall of electric low pressure mercury vapor-noble gas luminous tubes an uranium content in the range from about 0.6% to 1.6% $U_3O_8$ has been found to be most satisfactory. But the invention is not limited to glasses having an uranium content within this range. The favourable effect on luminescence, of the substances added according to the present invention is found also in glasses in which the uranium content is different, if their luminescence is compared for example with that of a glass of the composition described under (1) in which however the uranium content is equal to that of the glass of comparison.

The content of the glass in alumina or calcium oxide as stated above is not absolutely necessary. On the other hand, other substances may be contained in the glass, provided the said substances do not interfere with luminescence. Thus, for example, the glass might contain greater or smaller amounts of phosphoric acid, barium oxide, magnesium oxide, lithium oxide, etc. For example phosphoric acid may be used to replace the silicic acid.

A theoretic explanation why the prerequisites referred to above, or their combination, have the effect of increasing the luminescence of glasses containing uranium cannot be given at present. The result observed by the said expedients is surprising, and it could not be expected. Heretofore it was known that potash, zinc oxide and arsenic favour oxidizing melting, because they insure a certain "inner oxygen pressure" in the molten body of the glass. Therefore it might be assumed that by the presence of the said substances the uranium is transformed into the highest possible state of oxidation, and that thereby the increase of the luminescence might be explained. But this theory does not agree with the fact that it was not possible to obtain the slightest increase of the luminescence if in a test made on a large scale an energetic current of oxygen was introduced into the molten glass mentioned under (1) for a period of time of 45 minutes, and that, on the contrary, a slight reduction of the light intensity of a luminous tube made from this glass could be observed. Further this theory does not agree with the fact that a slight amount of fluorine substantially improves the luminescence.

Uranium glass the alkali content of which mainly consists of potassium oxide is known, and also such glass which simultaneously contains zinc oxide in an amount not more than 2%. In the last named glass the ratio of $K_2O$ to $Na_2O$ is but slightly higher than 1:1, so that neither a proper ratio of the alkalies nor the zinc oxide content can cause an increase of the luminescence of the glass. Further, both types of glass were molten free of arsenic and also free of fluorine. Thus a glass of the following composition:

| | Per cent |
|---|---|
| $SiO_2$ | 68.5 |
| $Al_2O_3$ | 1.6 |
| $Fe_2O_3$ | 0.02 |
| $B_2O_3$ | 3.15 |
| $U_3O_8$ | 0.82 |
| CaO | 5.40 |
| BaO | 1.15 |
| ZnO | 1.70 |
| $Na_2O$ | 8.30 |
| $K_2O$ | 9.30 | the batch of which, resulting in 100 kg. glass, was molten with an addition of 1.8 kg. potassium nitrate, and which was used as the wall of a luminous tube, effected a light intensity of the latter which was only 2.1 times that of a section of ordinary, dimmed clear glass of equal diameter sealed with the same luminous tube.

Also the uranium glasses mentioned above which do not contain zinc, and which have a high content of potash have a luminescence considerably less than the luminescence of the glass described under (5), because their luminescence is not increased by zinc oxide, arsenic oxide, fluorine and the slight amount of boric acid, which, in most cases, is not contained in the said known glasses.

The light intensity of luminous tubes the glass walls of which have been manufactured by my improved process can be further increased beyond the highest value stated above by adding to the glass containing uranium, compounds of such metals which, under the conditions prevailing are able to produce luminescence without simultaneously interfering with the luminescence of the uranium. For example, to the glass containing uranium, lead oxide may be added. The content in lead oxide in the glass does not increase the luminescence caused by the uranium. In daylight uranium-lead glass made as described herein has the same green luminescence as uranium glass, because the rays contained in daylight excite luminescence only of the uranium glass, but they are not able to excite luminescence of the lead glass. If, however, from the glass the wall of a low pressure mercury vapor-noble gas luminous tube is made, which produces much short-wave ultraviolet light of 25 37 Å. E., and of wave lengths adjacent thereto the glass has an intense blue-green luminescence, because under this kind of excitement the blue luminescence caused by the lead is added to the green luminescence of the uranium. By grading the lead content of the glass, for example from 0.1 to 35% PbO and more, and by grading the content in uranium, luminescences of different colour shades from green to blue may be obtained. In the batches of such glasses the addition of arsenic trioxide or arsenic pentoxide should not be too high, in order to avoid opacifying of the glass by the formation of lead arsenate.

The effect of the arsenic of increasing the light intensity of a glass which in addition to uranium oxide has a content in lead oxide is but small, and therefore, in such glass the arsenic may be omitted.

A glass having a primary composition according to the invention, for example that described under (5) has not only a valuable influence on the luminescence of uranium in the glass, but also on the luminescence of the glass containing lead alone as luminescence affording constituent, in so far as the blue luminescence caused by the lead content of the glass is more intense as compared to the luminescence of lead glass the primary composition of which is that referred to under (1), in which however the uranium oxide is replaced with lead oxide.

A luminous tube which has been externally dimmed by means of a sand blast, the wall of which has a content of lead oxide of about 0.4%, and the primary composition of which substantially corresponds to that referred to under (1) has a light intensity which is about 2.1 times the light intensity of a tube section of dimmed, non-luminescent, colourless clear glass. If with the same content in lead oxide the glass has a composition such as has been described under (5), which however does not contain uranium and also no arsenic pentoxide, the light intensity of a luminous tube is 2.7 times that of a tube section made from non-luminescent dimmed and colourless clear glass sealed with the same luminous tube. By providing an outside coating of opal glass instead of dimming the surface of the glass by means of the sand blast the light intensity will be 3 times that of a tube section of dimmed clear glass.

I claim:

1. Luminescent glass of the uranium-lead type carrying a luminescence-affording content of a compound of a metal of the group that consists of uranium and lead, such glass being of intensified luminescence by virtue of an alkali content in which potassium oxide is preponderant over sodium oxide by at least a 2:1 ratio and a zinc oxide content of substantially 3.5–7.0%.

2. Luminescent glass of the uranium type carrying a luminescence-affording content of an uranium compound, such glass being of intensified luminescence by virtue of an alkali content in which potassium oxide is preponderant over sodium oxide by at least a 2:1 ratio and a zinc oxide content of substantially 3.5–7.0%.

3. Luminescent glass of the uranium type carrying a luminescence-affording content of a compound of uranium, such glass being of intensified luminescence by virtue of a content of zinc oxide of substantially 3.5–7.0% and an arsenic oxide content of substantially 0.3%.

4. Clear, luminescent glass of the uranium-lead type carrying a luminescence-affording content of a compound of a metal of a group that consists of uranium and lead, such glass being of intensified luminescence by virtue of a content of zinc oxide of substantially 3.5–7.0% and a fluorine content of the order of 1.95%, and of substantially the maximum quantity short of causing opalescence.

5. Luminescent glass of the uranium-lead type carrying a luminescence-affording content of a compound of a metal of a group that consists of uranium and lead, such glass being of intensified luminescence by virtue of a content of zinc oxide of substantially 3.5–7.0% and a boric acid anhydride content of substantially 2–4%.

6. Luminescent glass of the uranium type, carrying a luminescence-affording content of a compound of uranium, the amount of which, calculated as $U_3O_8$, is from 0.6 to 1.6% of the whole, such glass being of intensified luminescence by virtue of an alkali content in which potassium oxide preponderates over sodium oxide by at least a 2:1 ratio and a zinc oxide content of substantially 3.5–7.0%.

7. Luminescent glass of the uranium type carrying a luminescence-affording content of a compound of uranium, the amount of which, calculated as $U_3O_8$, is from 0.6 to 1.6% of the whole, and a luminescence-intensifying content of zinc oxide, in substantially the quantity 3.5–7.0%.

8. Luminescent glass of the uranium type carrying in association with the luminescence-affording content of a compound of a metal of a group that consists of uranium and lead, a luminescence intensifying content of zinc oxide, such glass being of substantially the following composition: $SiO_2$, 64.30%; $Al_2O_3$, 2.25%; $B_2O_3$, 2.88%; $As_2O_5$, 0.60%; $Fe_2O_3$, 0.015%; $U_3O_8$, 1.12%; $CaO$, 1.86%; $ZnO$, 5.95%; $K_2O$, 17.80%; $Na_2O$, 1.26%; F, 1.95%.

9. An electric discharge tube having a wall of luminescent glass, the luminescent glass of the wall being of the uranium-lead type and carrying a luminescence-affording content of a compound of a metal of the group that consists of uranium and lead, such glass being of intensified luminescence by virtue of an alkali content in which potassium oxide is preponderant over sodium oxide by at least a 2:1 ratio and a zinc oxide content of substantially 3.5-7.0%.

10. An electric discharge tube having a wall of luminescent glass, the luminescent glass of the wall being of the uranium type and carrying a luminescence-affording content of a compound of uranium, such glass being of intensified luminescence by virtue of a content of zinc oxide of substantially 3.5-7.0% and an arsenic oxide content of substantially 0.3%.

11. An electric discharge tube having a wall of clear luminescent glass, the luminescent glass of the wall being of the uranium-lead type and carrying a luminescence-affording content of a compound of a metal of a group that consists of uranium and lead, such glass being of intensified luminescence by virtue of a content of zinc oxide of substantially 3.5-7.0% and a fluorine content of the order of 1.95% and of substantially the maximum quantity short of causing opalescence.

12. An electric discharge tube having a wall of luminescent glass, the luminescent glass of the wall being of the uranium-lead type and carrying a luminescence-affording content of a compound of a metal of a group that consists of uranium and lead, such glass being of intensified luminescence by virtue of a content of zinc oxide of substantially 3.5-7.0% and a boric acid anhyride content of substantially 2-4%.

13. A clear, luminescent glass of the uranium type carrying a luminescence-affording content of a compound of uranium, such glass being of intensified luminescence by virtue of an alkali content in which potassium oxide is preponderant over sodium oxide by at least 2:1 ratio, a content of zinc oxide of substantially 3.5 to 7.0%, an arsenic-oxide content of substantially 0.3%, and a fluorine content of the order of 1.95%.

14. A clear, luminescent glass of the uranium type and carrying a luminescence-affording content of uranium oxide in substantially the range of 0.6 to 1.6%, a boric-acid-anhydride content of at least 2%, a zinc-oxide content of substantially 3.5 to 7.0%, an alkali content in which potassium oxide is preponderant over sodium oxide by at least a 2:1 ratio, an arsenic-oxide content of substantially 0.3%, and a fluorine content of the order of 1.95%.

15. A glass-batch of oxidizing character that carries an uranium-compound content, a boric-acid content, a zinc-oxide content, a content of alkali-containing substances, an arsenic-compound content, and a fluorine-compound content, proportioned as specified, and productive when smelted of a clear luminescent glass carrying an uranium-oxide content of 0.6 to 1.6%, a boric-acid-anhydride content of at least 2%, an alkali content in which potassium oxide is preponderant over sodium oxide by at least a 2:1 ratio, an arsenic-oxide content of substantially 0.3%, and a fluorine content of substantially 1.95%.

16. An electric discharge tube having a wall of luminescent glass, the luminescent glass of the wall being of the uranium type and carrying a luminescence-affording content of an uranium compound, such glass being of intensified luminescence by virtue of an alkali content in which potassium oxide is preponderant over sodium oxide by at least a 2:1 ratio and a zinc oxide content of substantially 3.5-7.0%.

17. An electric discharge tube having a wall of luminescent glass, the luminescent glass of the wall being of the uranium type and carrying, in association with the luminescence-affording content of a compound of uranium, a luminescence intensifying content of zinc oxide, such glass being of substantially the following composition: $SiO_2$, 64.30%; $Al_2O_3$, 2.25%; $B_2O_3$, 2.88%; $As_2O_5$, 0.60%; $Fe_2O_3$, 0.015%; $U_3O_8$, 1.12%; CaO, 1.86%; ZnO, 5.95%; $K_2O$, 17.80%; $Na_2O$, 1.26%; F, 1.95%.

HELLMUTH FISCHER.